US006417944B1

(12) United States Patent
Lahat et al.

(10) Patent No.: US 6,417,944 B1
(45) Date of Patent: Jul. 9, 2002

(54) ASYNCHRONOUS TRANSFER MODE SWITCH UTILIZING OPTICAL WAVE DIVISION MULTIPLEXING

(75) Inventors: Amir Lahat, Kibbutz Givat Brenner; Yackov Sfadya, Kfar Saba, both of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/086,424

(22) Filed: May 28, 1998

(51) Int. Cl.[7] .......................... H04J 14/02; H04J 14/08
(52) U.S. Cl. ....................... 359/124; 359/139
(58) Field of Search ................. 359/139, 124

(56) References Cited

U.S. PATENT DOCUMENTS

| 5,483,536 A | 1/1996 | Gunji et al. | 370/85.14 |
| 5,550,818 A | 8/1996 | Brackett et al. | 370/60 |
| 5,566,014 A | 10/1996 | Glance | 359/124 |

OTHER PUBLICATIONS

Perlman, R., "Interconnections: Bridges and Routers", Addison–Wesley Publishing, Section 9.2.4, Chapter 9, pp. 205–264 (1992).
Sedgewick, R., "Algorithms", Second Edition, Addison–Wesley Publishing, Chapter 17, pp. 245–257 (1988).
Doeringer, W. et al., "Routing on Longest–Matching Prefixes", IEEE/ACM Transactions on Networking, vol. 4, No. 1, Feb. 1996, pp. 86–97.
Williams, K. A., "A Distributed ATM Network Based on an Optical Passive Star", printed from website http://williams.cs.ncat.edu/ATMStar.htm, 2 pages, (1998).
"All–optical ATM–Switch based on Self–Electro–optic Effect Devices (SEED's)", printed from website http://www.stw.nl/projecten/T/tel3997.html, 2 pages, Feb. 2, 1997.

Primary Examiner—Jason Chan
Assistant Examiner—David C. Payne
(74) Attorney, Agent, or Firm—Howard Zaretsky

(57) ABSTRACT

An ATM switch which utilizes an all optical switching fabric to perform switching functions. The switch is based on fiber optics and Dense Wavelength Division Multiplexing (DWDM) technologies. The switch utilizes a centrally located optical switch fabric with multiple distributed interface cards. The switch module comprises an N X N passive star coupler which functions to pass the optical signal input present at any of its input ports to all of its output ports. Each output port has associated with it a unique wavelength. An optical filter set to the wavelength functions to block all wavelengths except for the wavelength associated with that particular output port. The ingress portion of each receive/transmit interface module comprises a tunable optical transmitter that is set to the wavelength corresponding to the desired destination output port. Cells are transmitted to the switch module on that wavelength and only the optical receiver associated with that wavelength receives the optical signal, the other output ports functioning to filter the signal. In this fashion, ATM cells received are switched to any output port utilizing WDM optical processing.

13 Claims, 6 Drawing Sheets

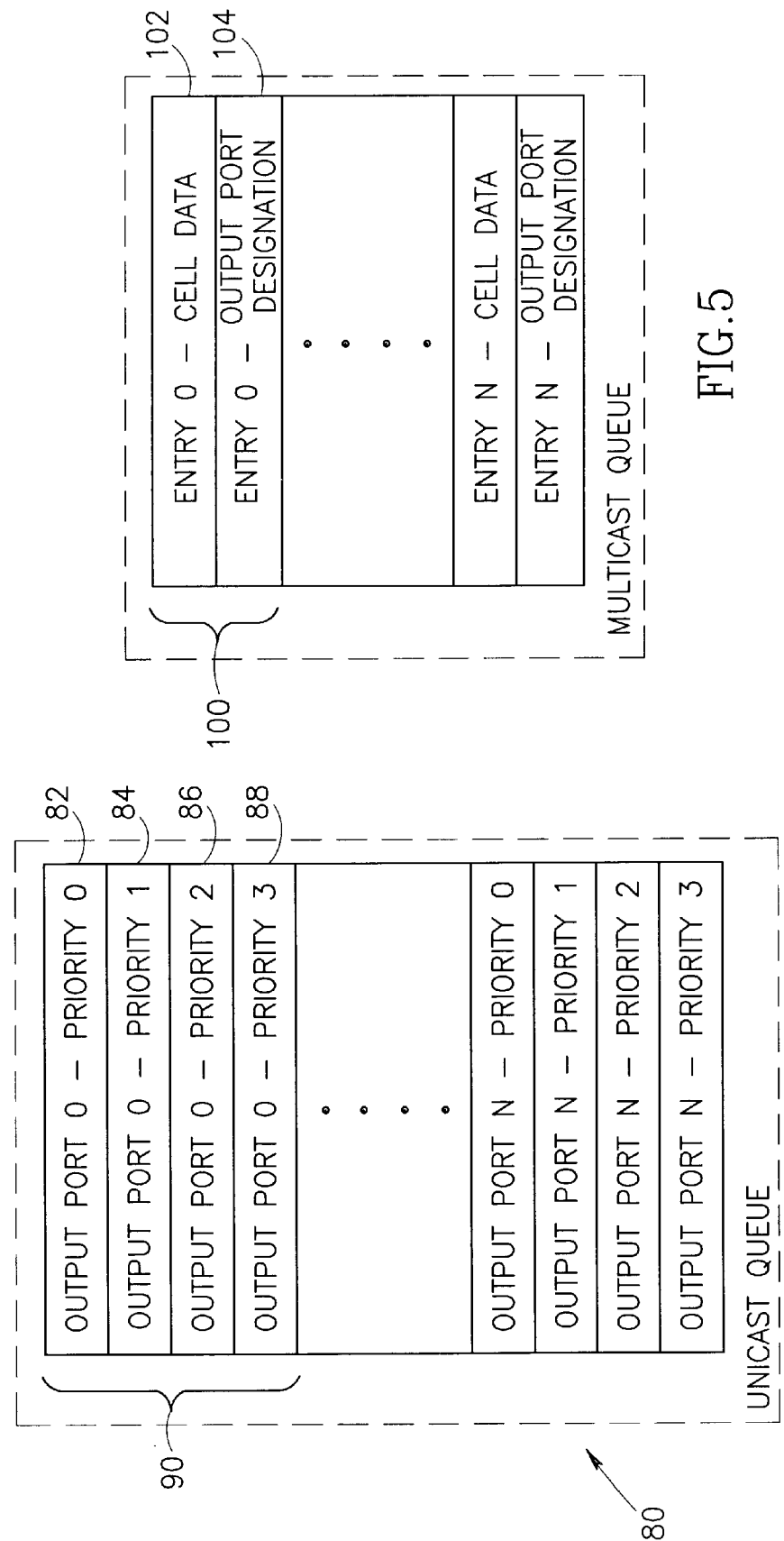

ASYNCHRONOUS TRANSFER MODE SWITCH UTILIZING OPTICAL WAVE DIVISION MULTIPLEXING

FIELD OF THE INVENTION

The present invention relates generally to data communications networks and more particularly relates to an ATM switch incorporating optical switching.

BACKGROUND OF THE INVENTION

Recently, more and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Asynchronous Transfer Mode

Asynchronous Transfer Mode (ATM) originated as a telecommunication concept defined by the Comite Consulatif International Telegraphique et Telephonique (CCITT), now known as the International Telecommunications Union (ITU), and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). In addition, ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM used very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

ATM is the enabling network technology for the high speed transmission of voice, data, video and multimedia information over communication links. Local Area Networks (LANs) based on ATM technology are becoming more and more popular due to the high speed and flexibility of ATM switching. ATM networks are typically configured in the shape of a star configuration with all the stations connected to a central switch or group of switches forming the network backbone. Currently, high speed electronic switches are used to route the ATM cells over the appropriate links. Although ATM is typically transmitted using optical communication links, the switches themselves are currently electronic based.

The benefits of optical communications are not utilized in current systems due to the frequent signal transformations from the optical domain to the electrical domain in order to provide the switching and routing functions.

In addition, the typical architecture of an ATM central switch includes a central ATM switch fabric and one or more interface (I/F) cards (modules). The interface modules incorporate the ATM cell processing, buffering and connection to the user interface which may be copper or optical fiber based. The central switch fabric includes the switch matrix and associated control functions thereof. The connection between the switch fabric and the interface modules is carried over a backplane printed circuit board (PCB). The connection is usually copper based and can be either parallel or serial.

There are numerous commercial vendors today that offer off the shelf building blocks for constructing such a switch. The main limitation, however, of this type of architecture is the throughput of the switch fabric which is currently limited to approximately 30 to 50 Gbps. The limitation is due to the limitations of current electronic switching technology. Another limitation is the connection over the backplane where the maximum bandwidth achievable today is limited to about 2.5 Gbps for each serial connection. Parallel connections can achieve much higher data rates but require large numbers of high speed serial connections aggregated together over the backplane PCB.

Current LAN Topology

Using ATM network technology as an example, the current topology of high performance ATM local area networks (LANs) includes ATM core switches at the backbone and an edge device having an ATM downlink to the one or more core switches. When a connection is established between two edge devices, the traffic must pass through the ATM switches in the core. Therefore, in order to support all potential connections between all edge devices, the ATM switches at the core need to be non blocking. Non blocking ATM switches are difficult to develop and thus are much more expensive.

In addition to the disadvantage described above, the resulting network may be limited in bandwidth. When attempting to establish large numbers of connections from the edge device, there may be a need for faster downlink data rates. Depending on the number of connections and the throughput required for each connection, the downlink capacity may not be sufficient to meet the needs of users.

An additional disadvantage is the amount of physical wiring required to implement such a network. In practice, each edge device must be connected to the ATM core via physical wires (i.e., cables). When considering a typical office building there may be many wires installed in parallel. A separate cable from each edge device on each floor must be run down to the ATM core farm which typically is located in the basement. Wherever the switch core farm or server is located, cables must be run from the switch core farm to each edge device. The total length of the required cabling can be relatively very high and thus have an associated very high cost.

The cost may be even higher depending on the type and length of cabling used. For example, in ATM networks, it is common to run high speed fiber optic cable from the ATM switch core to all the edge devices in the network. Data rates may range from OC-3 155 Mbps to OC-12 622 Mbps on the optical fiber, for example. Note that each optical fiber used in the network carries only a single communication channel using a single wavelength of light. If it is desired to maintain several communications channels at one time, more than one optical fiber is required. Using prior art transmission techniques, each communication channel requires a separate optical fiber.

Today, most legacy local area networks utilize ATM technology in combination with Switched Ethernet or Token Ring network topologies. The existing switching technology enables each user on the network to have their own dedicated bandwidth, e.g., 10 Mbps or 100 Mbps, for their networked software applications. Each user is given network connectivity to the local switched hub, e.g., 100 Mbps for a Fast Ethernet network interface card (NIC). In typical office building environments, each floor is provided with one or more switched hubs that users are directly connected to. If the switched hub has 16 10 Mbps ports than it may potentially be forced to handle an aggregate data rate of 1,600 Mbps data rate from all the connected users.

Wave Division Multiplexing

Wave division multiplexing (WDM) technology enables the simultaneous transmission of multiple data channel connections on the same physical optical fiber. This is achieved by utilizing several different wavelengths on the same optical fiber at the same time.

Using this type of network, several data sources can be sent simultaneously into a WDM mux whereby each data source uses a different wavelength. The optical WDM mux functions to combine the different wavelengths into one optical transmission light beam. This optical light beam is transmitted onto the optical fiber using an optical transmitter. The fiber carries multiple connections simultaneously. The optical light beam reaches an optical receiver which outputs the light beam to a WDM demux. The WDM demus functions to split the optical light beam into the different wavelengths that were originally sent. The different wavelength outputs of the WDM demux are input to individual receivers which convert the light energy into electrical signals.

Currently, the major use of WDM technology is in Wide Area Network (WAN) applications. The majority of WANs already have a large installed base of optical fiber. The optical fiber installed in WANs typically carry very high data rate traffic on the order of many gigabits per second. In addition, the demand for bandwidth and capacity is growing at an explosive rate. Today's WAN installations are being pushed to capacity in order to satisfy the demand for increasing levels of bandwidth.

Two different techniques can be used to transmit data at higher rates: (1) adding additional optical fibers or (2) to increase the rate of data at the edge devices on either end of the optical fiber. Both of these solutions are very costly: installing additional fiber optic cable is very costly and developing faster end equipment is difficult and expensive.

Currently available WDM technology, however, is a viable alternative to installing new fiber optic cable or upgrading the equipment on either end of the fiber. Using conventional WDM technology, several 'slow' conventional end devices can be connected to a WDM mux whereby several slower data sources are combined onto the same fiber and transmitted to the other end. At the far end of the fiber optic cable, the operation is reversed, i.e., the optical signal is optically WDM demuxed. Thus, WDM technology can be used as a bandwidth concentrator.

SUMMARY OF THE INVENTION

The present invention is an ATM switch which utilizes an all optical switching fabric to perform switching functions. The switch is based on fiber optics and Dense Wavelength Division Multiplexing (DWDM) technologies. The switch utilizes a centrally located optical switch fabric with multiple distributed interface cards. The optical switch fabric itself is substantially unlimited in bandwidth since the switching is performed using optical signals rather than electronic signals. Thus, a switch using such a switching fabric that utilized light can potentially reach data rates in the Terabit range. The switch utilizes fiber optic signal paths on the backplane to achieve substantially unlimited bandwidth from the interface card to the switching fabric. With currently available technology, each fiber optic link can carry traffic at data rates of 10 Gbps and up.

The switch module comprises an N X N passive star coupler which functions to pass the optical signal input present at any of its input ports to all of its output ports. Each output port has associated with it a unique wavelength. An optical filter set to the wavelength functions to block all wavelength except for the wavelength associated with that particular output port. The ingress portion of each receive/transmit interface module comprises a tunable optical transmitter which is set to the wavelength corresponding to the desired destination output port. Cells are transmitted to the switch module on that wavelength and only the optical receiver associated with the wavelength receives the optical signal. The other output ports filter the signal. In this fashion, ATM cells received are switched to any output port utilizing WDM optical processing.

Throughout this document the term wave division multiplexing (WDM) denotes using a single optical fiber to transmit several communications channels simultaneously whereby each channel transmits data utilizing a different wavelength of light. The term dense wavelength division multiplexing (DWDM) denotes WDM that utilizes several wavelengths of light that are relatively close to one another.

There is provided in accordance with the present invention an optical Asynchronous Transfer Mode (ATM) switch comprising a plurality of receive/transmit interface modules, each interface module adapted to generate and process ATM cells from signals received over a receive link, the interface module adapted to transmit signals over a transmit link in accordance with processed ATM cells to be transmitted, the interface module operative to determine a destination output port and a wavelength associated therewith, a switch module have N input ports and N output ports wherein one input port and one input port are associated with each interface module, the switch module operative to pass an optical signal present at any of its input ports to all of its output ports and wherein each interface module transmits ATM cells to the switch module utilizing a particular wavelength associated with the destination output port and wherein each interface module is adapted to filter all wavelengths of light except for the wavelength associated therewith.

The switch further comprises means for sensing the presence of optical signal at the wavelength to be transmitted to an input port on the switch module. The interface module comprises a receive interface for converting an optical signal received over the receive link to an electrical signal, an ATM layer cell processor for processing cells received from the receive link, a tunable optical transmitter for transmitting an optical signal at a wavelength configured therewith, a memory for storing one or more cell queues and a scheduler for determining the order in which queues are to transmit data to the switch module, the scheduler setting the tunable optical transmitter to the wavelength corresponding to the destination output port associated with the cell to be transmitted to the switch module.

The interface module comprises an optical filter set to a wavelength corresponding to the wavelength assigned to the output port on that particular interface module, an optical receiver for converting an optical signal to an electrical signal, an ATM Layer cell processor for processing cells to be transmitted over the transmit link and a transmit interface for converting an electrical signal to an optical signal for transmission over the transmit link.

The switch further comprises a tunable optical sense unit adapted to receive an optical signal from an output port on the switch, the tunable optical sense unit for detecting the presence of optical signal at a wavelength configurable therein. The switch module comprises a passive star N X N optical coupler.

BRIEF DESCRIPTION OF THE DRAWINGS

The invention is herein described, by way of example only, with reference to the accompanying drawings, wherein:

FIG. 4 is a diagram illustrating the structure of the unicast queue utilized in the scheduling of unicast cells for transmission through the switch module;

FIG. 5 is a diagram illustrating the structure of the multicast queue utilized in the scheduling of multicast cells for transmission through the switch module;

DETAILED DESCRIPTION OF THE INVENTION

Notation Used Throughout

The following notation is used throughout this document.

| Term | Definition |
| --- | --- |
| ALM | ATM Layer UNI Manager |
| ANSI | American National Standards Institute |
| ATM | Asynchronous Transfer Mode |
| CCITT | Comite Consulatif International Telegraphique et Telephonique |
| CD | Collision Detection |
| CSMA | Carrier Sense Multiple Access |
| DWDM | Dense Wavelength Division Multiplexing |
| FDDI | Fiber Distributed Data Interface |
| I/F | Interface |
| IP | Internet Protocol |
| ITU | International Telecommunications Union |
| LAN | Local Area Network |
| LUT | Lookup table |
| MC | Multicast |
| NIC | Network Interface Card |
| NNI | Network to Network Interface |
| OC-n | Optical Carrier-n (where the speed equals n times 51.84 Mbps) |
| PCB | Printed Circuit Board |
| QoS | Quality of Service |
| RAM | Random Access Memory |
| SDH | Synchronous Digital Hierarchy |
| SONET | Synchronous Optical Network |
| TCP | Transmission Control Protocol |
| UNI | User to Network Interface |
| VCI | Virtual Circuit Indicator |
| VPI | Virtual Path Indicator |
| WAN | Wide Area Network |
| WDM | Wavelength Division Multiplexing |

General Description

Figure 1:
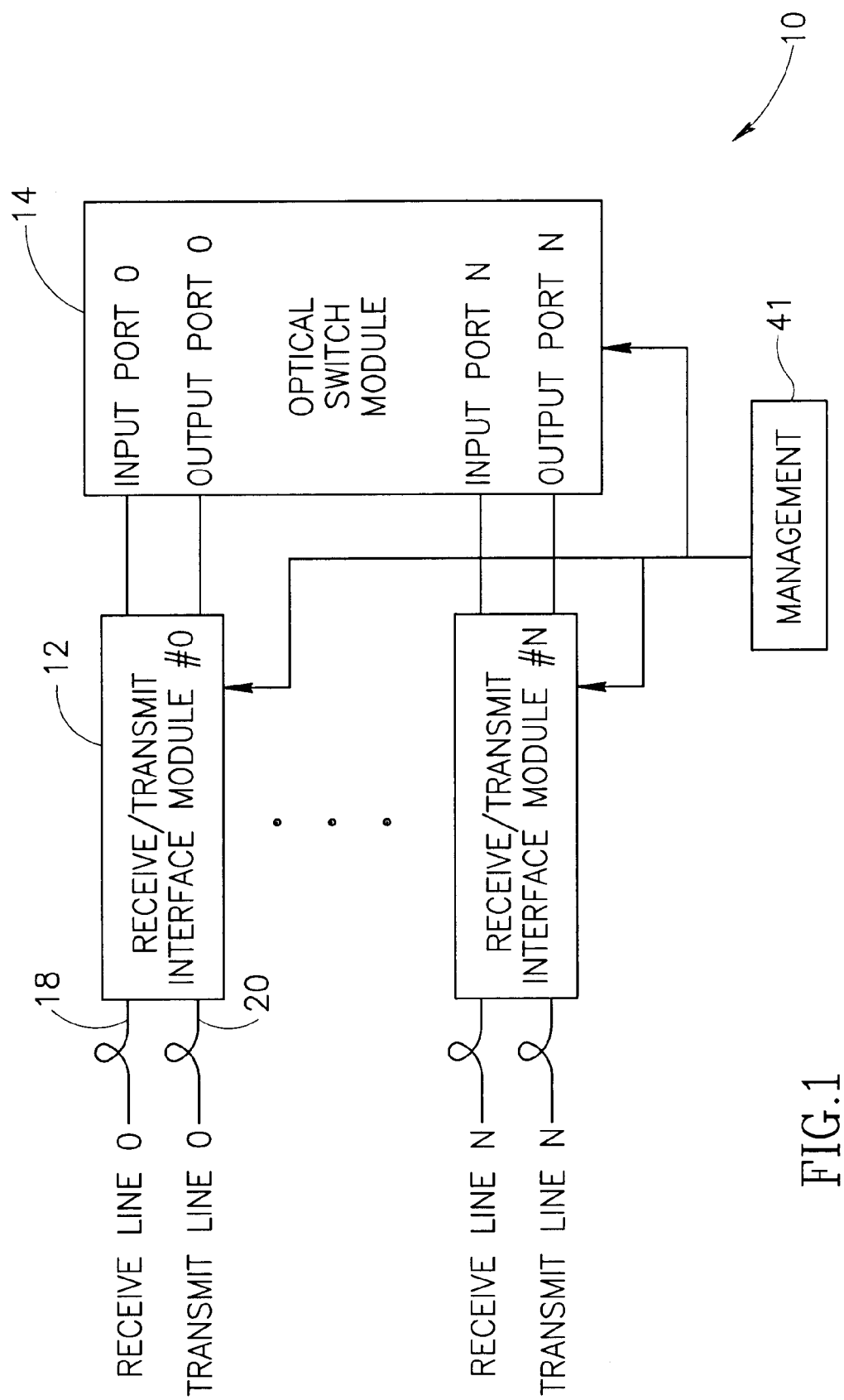
FIG. 1 is a block diagram illustrating an optical ATM switch constructed in accordance with the present invention.

A block diagram illustrating an optical ATM switch constructed in accordance with the present invention is shown in FIG. 1. The optical switch, generally reference 10, comprises one or more receive/transmit interface (I/F) modules 12 labeled receive I/F module #0 to #N, an optical switch module 14 and a management module 41.

Each receive/transmit I/F module 12 is coupled to a receive communication line or link 18 which may comprise either optical or copper media. Each communication link is input to a receive/transmit I/F module 12. Similarly, the output of each receive/transmit I/F module 12 is transmitted over a transmit communication link 20 which also may comprise either optical fiber or copper media. In the example provided herein, the switch is connected to optical fiber receive and transmit links. The invention, however, is not limited to optical fiber and can operate with copper receive and transmit links as well.

If the receive link is optical fiber based, the optical data received over a receive link is converted to the electrical domain by the receive/transmit I/F module. The received ATM cells are processed and a destination output port is determined for the cell based on the destination ATM address. The cell is converted back to optical format and then input to the optical switch module which passes it to one of the receive/transmit I/F modules for output over a transmit link. The receive/transmit I/F module that the cell is destined for converts the cell from optical to electrical and transmits the cell over the transmit fiber link.

A management module 41 functions to provide network management, administration and control functions to the various components of the switch 10.

Receive/Transmit Interface Module

Figure 2:
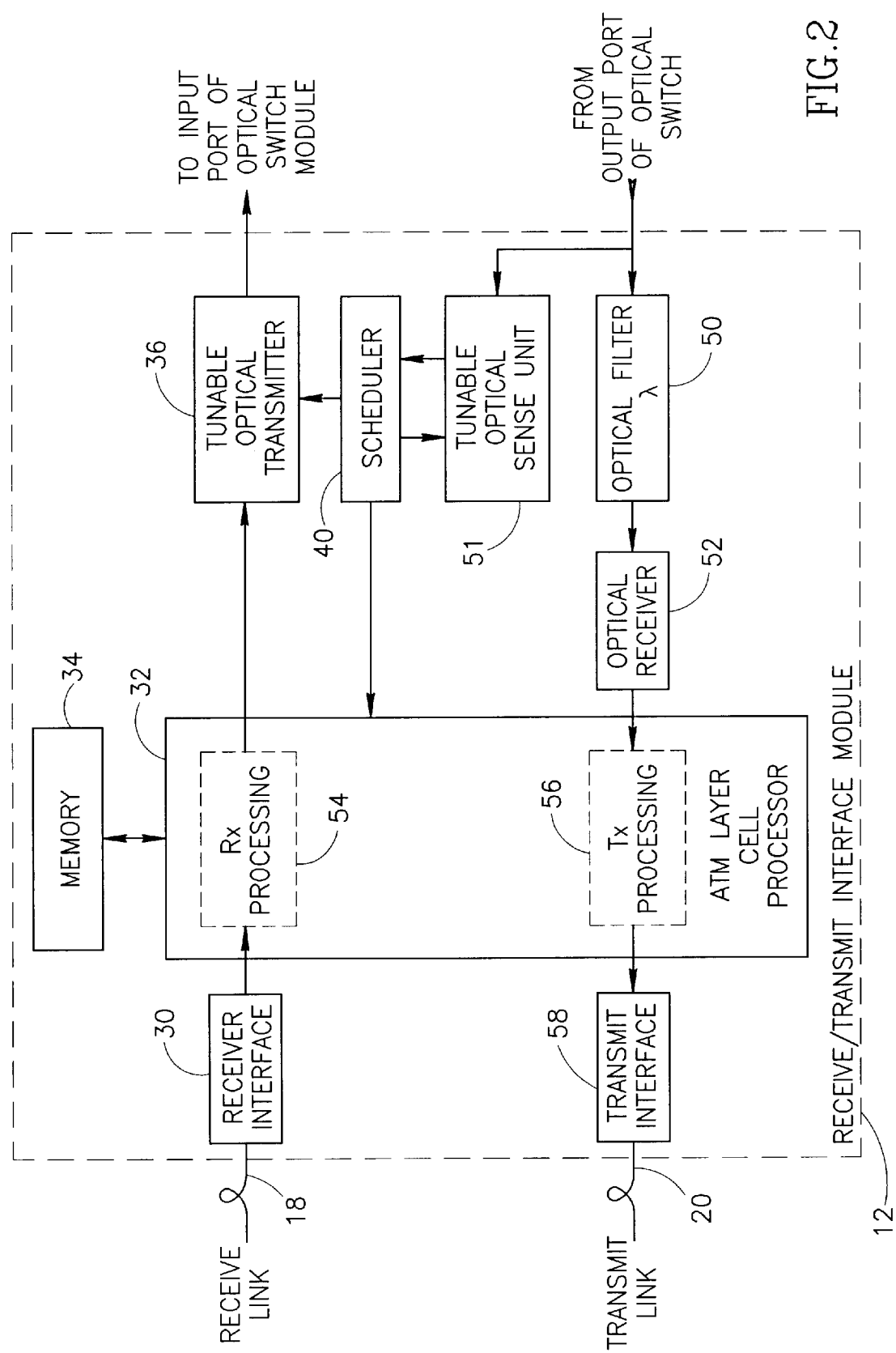
FIG. 2 is a block diagram illustrating the receive/transmit interface module portion of the present invention in more detail.

A block diagram illustrating the receive/transmit interface module portion of the present invention in more detail is shown in FIG. 2. The interface module 12 comprises a receive portion and a transmit portion. The receive portion comprises a receive interface 30, ATM cell processor 32, memory 34 and tunable optical transmitter 36. The receive link 18 from the communication link is input to the receive interface 30. Through this link, either an end user or another switch is connected to the interface module. The connection is a standard ATM connection and may comprise either optical fiber or copper media. Higher communication data rates are achievable using optical fiber, thus the example herein assumes optical fiber at the receive end.

The ingress portion of the interface module comprises the physical layer conversion from the optical system domain to the electrical domain. In addition, any needed conversions are performed from Synchronous Optical Network (SONET) or Synchronous Digital Hierarchy (SDH) signal protocols to ATM cell format. SONET is an ANSI defined standard for high speed digital optical transmission. It has been recognized as the North American standard for SDH. SDH is the hierarchy that determines signal interfaces for very high speed digital transmission over optical fiber links.

A suitable optical to electrical receiver for use in the receive interface 30 is the model NetLight 1417K4A 1300 nm Laser 2.5 Gbps SpeedBlaster optical transceiver manufactured by Lucent Technologies, Breinigsville, Pa. This transceiver includes both an optical receiver and transmitter in a single unit and can achieve SONET OC-48 data rates.

The ATM Layer cell processor 32 comprises a receive processing portion 54 and a transmit processing portion 56. The receive processing portion 54 performs ATM layer processing on the received ATM cells. In particular, the ATM cell processor reads the destination VPI/VCI field, i.e., the destination ATM address, from the received cell and, utilizing a preconfigured look up table (LUT) (not shown), forwards the cell to a corresponding buffer in the memory 34. The LUT is initialized at time of rested and updated via the management module 41 (FIG. 1).

An ATM Layer cell processor suitable for use with the present invention is the LUC4AU01 ATM Layer UNI Manager (ALM) manufactured by Lucent Technologies, Allentown, Pa. The ALM Device performs ATM Layer UNI Management functions and supports up to 622 Mbps (OC-12) of ATM traffic. Any port on the device can be configured as a UNI or NNI connection. To accommodate receive link data rates higher than OC-12, such as OC-48 (2.5 Gbps) or OC-192 (10 Gbps), an ATM Layer processor is required that can receive data at such rates. The functionality of commercially available ATM Layer processors can be combined with faster front end interfaces to accommodate higher speeds. For example, an FPGA, ASIC or other suitable device can be utilized with wider input and output data buses in order to handle higher data rates. Thus, currently available ATM Layer processor can be scaled to operate all higher speeds by constructing wider input data interfaces with additional parallel input data lines.

The memory 34 comprises RAM memory or any other suitable memory means. The memory 34 is used to store a plurality of queues (buffers) with each possible output port having a corresponding queue in the memory. Note that each receive link has associated with it a dedicated memory 34 and ATM Layer cell processor 32.

A scheduler 40 controls the release of cells from the receive/transmit I/F modules that are sent to the switch module. The scheduler functions to continually check the occupancy status of the queues within the memory 34 and determines when the contents of a queue are to be sent to the switch module. When the scheduler decides to send the data in a queue to the switch, it first looks up the wavelength corresponding to the destination output the queue is assigned to. The scheduler switch sends a control signal to the tunable optical transmitter 36 setting it to a particular wavelength.

A tunable optical transmitter suitable for use with the present invention is model Anywave NYW 40ITU Tunable Semiconductor Laser Module, manufactured by Altitun, Kista, Sweden. This tunable optical transmitter is wavelength tunable over the full erbium band including ITU channels from 1528.77 to 1560.61 nm and has wavelength switching time of 20 ns or less.

A key feature of the present invention is that each output port in the switch has a unique wavelength $\lambda$ associated with it. The scheduler determines the wavelength that the tunable optical transmitter 36 should transmit the data on. Thus, the ATM Layer cell processor utilizes a LUT to determine the corresponding output port for each ATM cell received. Each output port, in turn, has associated with it a wavelength that is unique among all the output ports. Based on this wavelength, the scheduler sets the tunable optical transmitter to the wavelength corresponding to the destination output port.

The output of the tunable optical transmitter is input to an input port on the optical switch module 14 (FIG. 1). The optical switch module functions to pass optical signals input on any of its input ports to each of its output ports. Thus, the optical switch performs a coupling function whereby any optical signal input on any of N input ports is coupled to each of N output ports.

An optical coupler suitable for use with the present invention is model C-SS-5SH-B-XX-10-F/F-C Singlemode Star Coupler, manufactured by Walsin Lihwa Corp., Taipei, Taiwan, ROC. This model passive optical star coupler provides 32 inputs by 32 outputs. Note that since the passive star coupler is light based, there is substantially no bandwidth limitation placed on the optical signal transmitted therethrough.

The output of the switch corresponding to a particular input is connected to the same interface module. Thus, input port 0 and output port 0 of the switch are connected to the same interface module. The optical signal output from the switch is input to an optical filter 50 whose filter characteristics are set to pass only optical signals having a particular wavelength. Either a fixed or tunable optical filter may be used. Each optical filter 50 in each interface module is set to a unique wavelength. For example, for a 32 port switch module and 32 input and output ports, there are 32 unique wavelengths, with each optical filter set to a different wavelength.

An optical filter suitable for use with the present invention is the TB2500M Series of Tunable Fabry-Pero Etalon Filters, manufactured by JDS Fitel, Ontario, Canada.

The output of the optical filter is input to the optical receiver 52 with is a wideband receiver able to receive any of the N wavelengths in use in the switch. The optical receiver functions to convert the optical signal into an electronic signal. An optical receiver suitable for use with the present invention is the model PGR 5066 Optical Receiver Module, manufactured by Ericsson, Kista-Stockholm, Sweden. This particular optical receiver operates at a data rate of 2.5 Gbps (OC-48).

The output of the optical receiver 52 is input to the transmit processing portion 56 of the ATM Layer cell processor 32. The data is processed and output to the transmit interface 58 which converts the signal from electrical domain to the optical domain for transmission over the transmit link 20. The transmit interface 58 may comprise the transmit portion of the NetLight 1417K4A 1300 nm Laser 2.5 Gbps SpeedBlaster optical transceiver manufactured by Lucent Technologies, Breinigsville, Pa. This transceiver includes both an optical receiver and transmitter in a single unit and can achieve SONET OC-48 data rates.

In addition to being input to the optical filter 50, the optical signal output by the switch module is also input to a tunable optical sense unit 51. The sense unit 51 functions to detect whether an optical signal is present at a particular wavelength. The wavelength is set by the scheduler 40 and the detection signal is read by the scheduler.

As described previously, the scheduler configures the tunable optical transmitter with the wavelength corresponding to the destination output port. Before sending data to the switch, the scheduler checks whether a signal at that wavelength is present. Thus, the scheduler checks for a collision before sending any data. This is similar to CSMA/CD techniques which are widely used in Ethernet networks.

If no signal is detected, the data in the queue is transmitted to the switch module, which, in turn, couples the signal to all of its output ports. Thus, the signal is present at the input to each of N optical filters. Although the signal is present at each output port, only the interface module assigned that particular wavelength will pass and process the data. This is because the optical filter blocks all wavelengths other than the designated wavelength.

Figure 3:
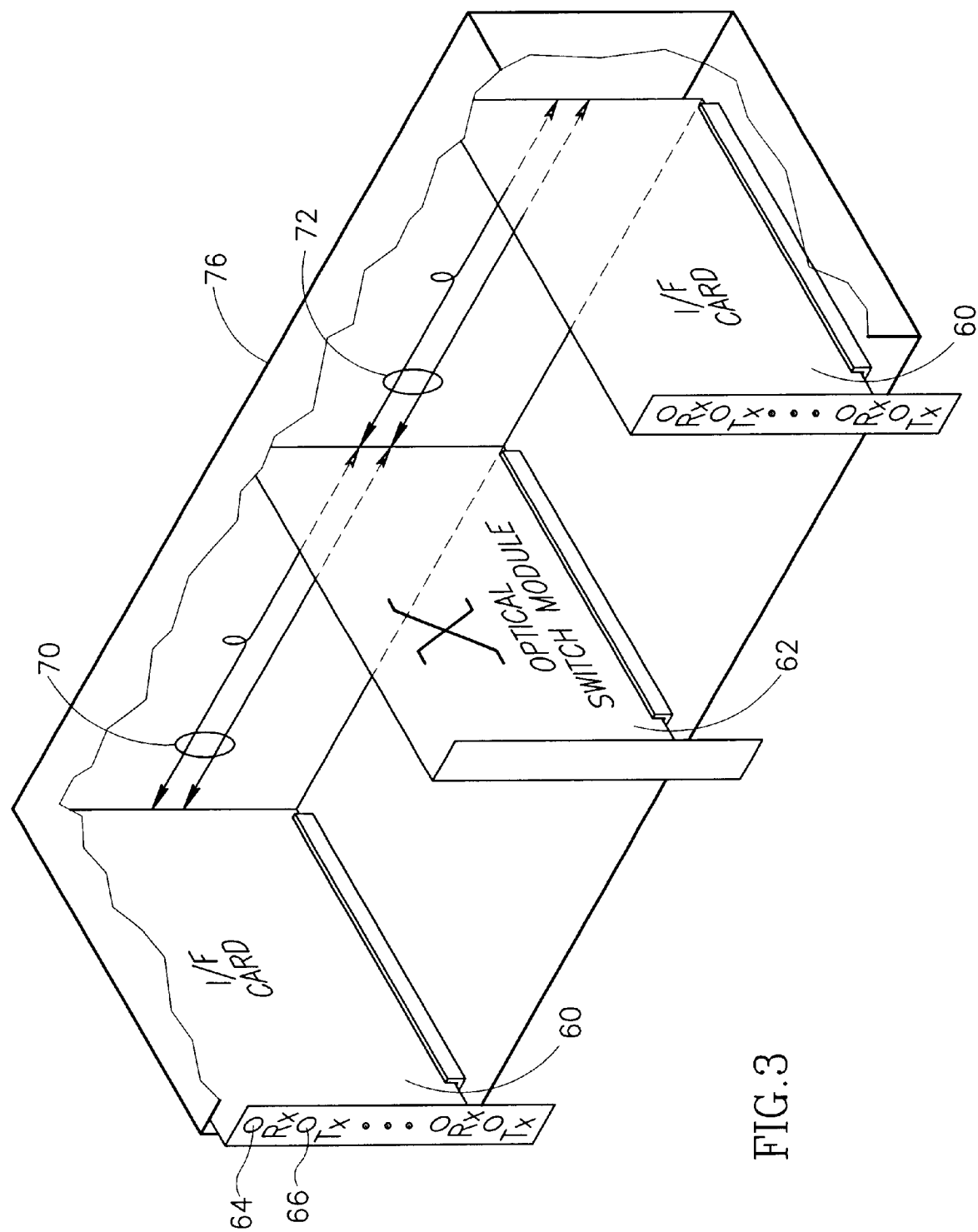
FIG. 3 is a diagram illustrating the optical switch module and multiple interface cards connected together via optical and/or electrical signals over the backplane.

A diagram illustrating the optical switch module and multiple interface cards connected together via optical and/or electrical signals over the backplane is shown in FIG. 3. The switch 10 can be constructed from a plurality of interface cards 60 which comprise one or more interface modules. Each interface module on the interface card 60 comprises a receive link connector interface 64 and a transmit link connected interface 66. Note that if two or more receive/transmit interface modules are placed on a single card, only a single scheduler is needed to service all the interface modules. If a single scheduler is used to service more than one interface module, the scheduler makes sure not to set two or more tunable optical transmitters to the same wavelength. This permits contention for the same output port to be resolved on an interface card basis.

A switch module 62 is preferably centrally located within the card cage rack 76 in order to reduce the length of the backplane connections. The backplane comprises a plurality of signal connections 70, 72. The connections may comprise any combination of optical fiber and copper connections. The signal path from the interface modules on each interface card to the switch module is preferably via optical fiber.

A diagram illustrating the structure of the unicast queue utilized in the scheduling of unicast cells for transmission through the switch module is shown in FIG. 4. The memory 34 (FIG. 2) on each interface module is used to store the queue for unicast cells. The unicast queue 80 comprises N sets 90 of queues wherein each set comprises four queues 82, 84, 86, 88, one for each delay priority which corresponds to different Quality of Service (QoS) levels. Thus, for example, to support a 32×32 switch module and four priority levels, requires 128 separate queues per input port.

Note that the scheduler can select which unicast queue to transmit based on any desired scheduling scheme. One example is to use a round robin technique giving equal preference to each queue.

A diagram illustrating the structure of the multicast (MC) queue utilized in the scheduling of multicast cells for transmission through the switch module is shown in FIG. 5. Multicast cells are handled differently than unicast cells. The multicast queue comprises a plurality M of sets 100 of entries. Each set 100 comprises a cell data buffer 102 and a bitmap 104 indicating the destination output port designations. Each output port the multicast cell is destined has a corresponding bit set in the bitmap. The ATM Layer cell processor places the multicast cell to be transmitted to the switch in an available entry in the multicast queue. When the arbiter in the cell processor selects an entry for transmission, the multicast cell is transmitted to each designated destination output port individually. For each destination output port, the scheduler determines the corresponding wavelength and configures the tunable optical transmitter and tunable optical sense unit in accordance thereof. In other words, each output port the multicast cell is destined for, is handled as a individual unicast cell. The difference being that the same cell is transmitted separately over and over to each destination output port.

Figure 6:
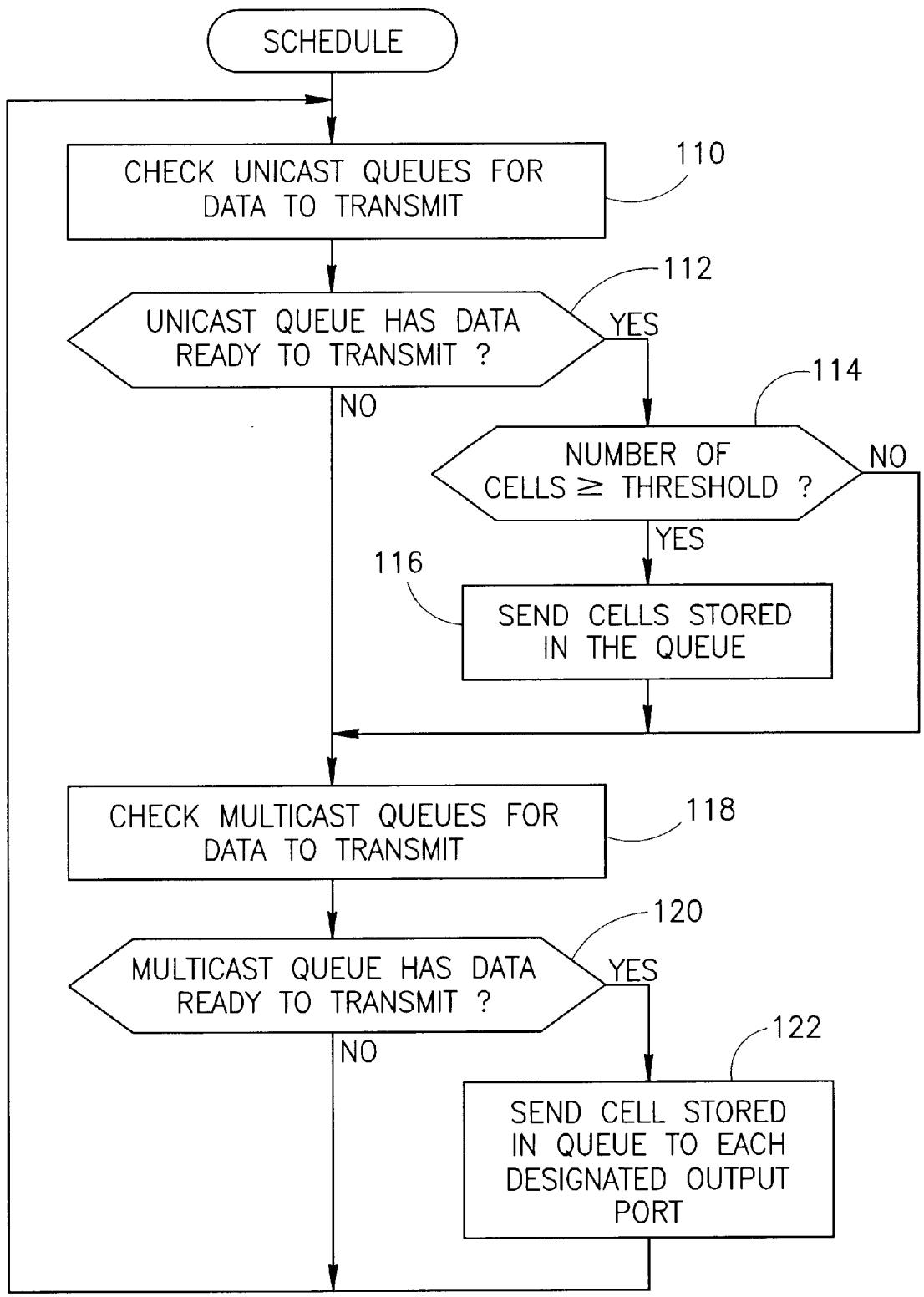
FIG. 6 is a flow diagram illustrating the scheduler method portion of the present invention.

A flow diagram illustrating the scheduler method portion of the present invention is shown in FIG. 6. Initially, the scheduler checks the unicast queues for data to transmit (step 110). If data is found (step 112), the number of cells present in the buffer is determined and if the number of cells is greater then or equal to a predetermined threshold (step 114), the cells stored in the queue are transmitted to the switch module (step 116). In one embodiment, the threshold can be set to 10 cells, for example.

Another use of storing cells until a specified number have accumulated is when tunable optical transmitters are used that cannot tune at cell speeds. In this case, it is desirable to store a number of cells and transmit them after a certain number have accumulated so as to spread the overhead of switching wavelengths over many cells.

If the unicast queue has no data to transmit, the multicast queue is checked for data to transmit (step 118). If the multicast queue has data ready to transmit (step 120), the cell stored in the queue entry is transmitted to each designated output port (step 122).

Figure 7:
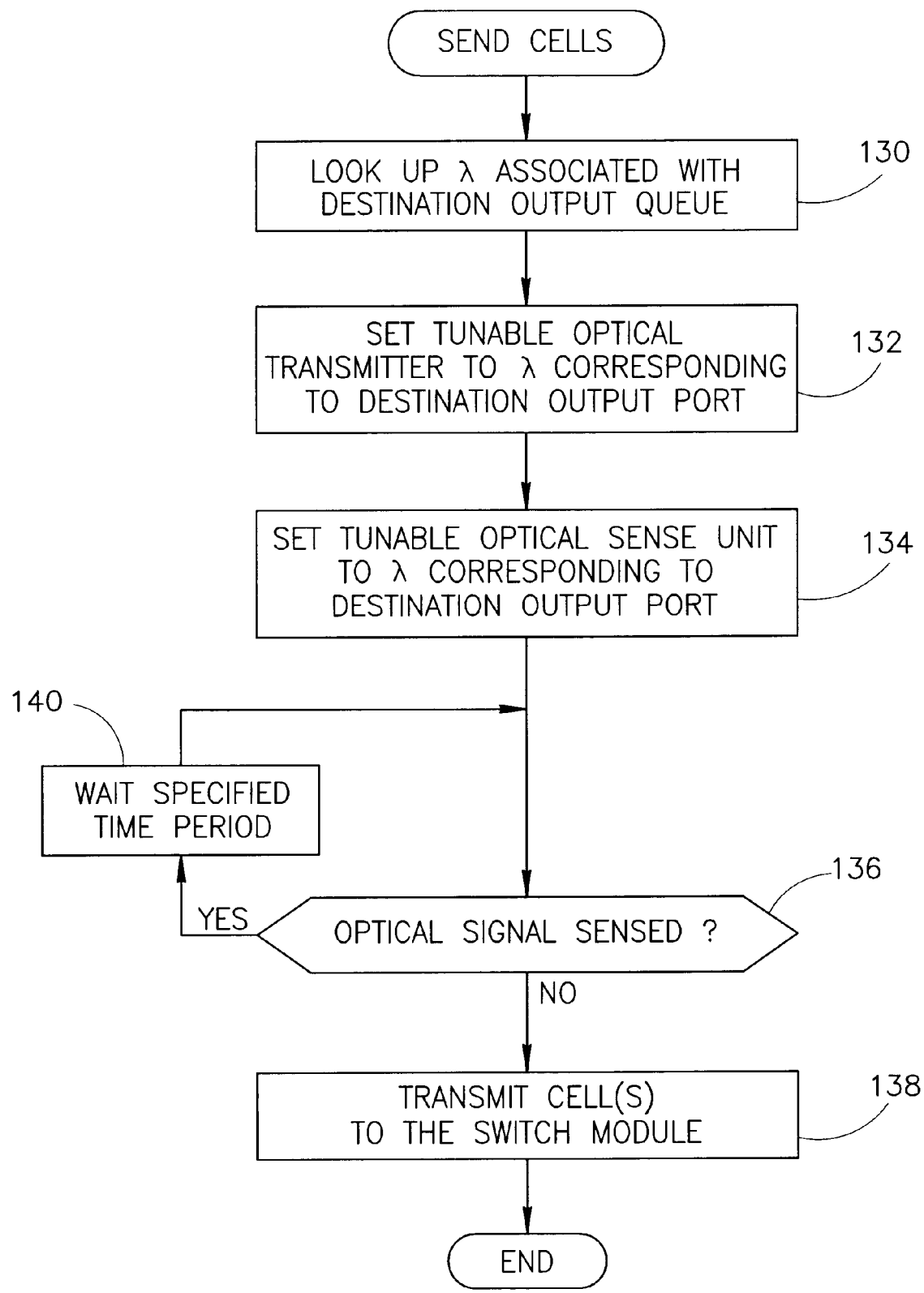
FIG. 7 is a flow diagram illustrating the cell transmitting method the present invention in more detail.

A flow diagram illustrating the cell transmitting method of the present invention in more detail is shown in FIG. 7. As described briefly above, the transmission of cells to the switch requires the tunable optical transmitter 36 (FIG. 2) and the tunable optical sense unit to be configured with the wavelength associated with the desired destination output port. The first step is to look up the $\lambda$ associated with the output port (step 130). Next, the tunable optical transmitter is set to the $\lambda$ corresponding to the output port (step 132). In addition, the tunable optical sense unit is also set to the $\lambda$ corresponding to the output port (step 134).

If an optical signal is sensed (step 136) it means that another interface module is transmitting data to the switch using the same wavelength. The scheduler then waits a specified time period (step 140) before sensing for the presence of an optical signal again. While the scheduler is waiting, additional cells may arrive destined for the same output port. These cells are stored in the appropriate queue in the memory until they can be transmitted to the switch module.

Note that in order to avoid multiple collisions, each interface module can be configured to wait a different amount of time after sensing signal at the particular wavelength. Absent the presence of an optical signal (i.e. no contention), the one or more cells are transmitted to the switch (step 138).

While the invention has been described with respect to a limited number of embodiments, it will be appreciated that many variations, modifications and other applications of the invention may be made.

What is claimed is:

1. An optical switch for switching a stream of Asynchronous Transfer Mode (ATM) cells received over one of a plurality of receive lines and being switched to one of a plurality of transmit lines, comprising
    a plurality of receive/transmit interface modules, each interface module adapted to generate and process ATM cells from signals received over said receive line and to store said processed ATM cells in one of a plurality of queues, each queue corresponding to a particular destination port and priority, said interface module adapted to transmit signals over a transmit line in accordance with processed ATM cells to be transmitted, said interface module operative to determine a destination output port and a wavelength associated therewith;
    a switch module having a plurality of input ports and a plurality of output ports wherein one input port and one output port are associated with each interface module, said switch module operative to pass an optical signal present at any of its input ports to all of its output ports;
    wherein for each queue having data to be transmitted, each interface module transmits ATM cells to said switch module utilizing the wavelength associated with the destination output port to which the ATM cell is be forwarded; and
    wherein each interface module is adapted to filter all wavelengths except for the wavelength associated therewith.

2. The switch according to claim 1, further comprising means for sensing the presence of optical signal at the wavelength transmitted associated the destination output port associated with the ATM cell to be forwarded.

3. The switch according to claim 1, wherein said interface module comprises:
    a receive interface for converting an optical signal received over said receive link to an electrical signal;
    an ATM Layer cell processor for processing cells received from said receive link;
    a tunable optical transmitter for transmitting an optical signal at a wavelength associated with the destination output port associated with the ATM cell to be forwarded;
    a memory for storing a plurality of cell queues; and
    a scheduler for determining the order in which the contents of queues are to be transmitted to said switch module, said scheduler setting said tunable optical transmitter to the wavelength corresponding to the destination output port associated with the cell to be forwarded.

4. The switch according to claim 1, wherein said interface module comprises:
    a fixable tuned optical filter set to a wavelength corresponding to the wavelength assigned to the output port on that particular interface module and adapted to filter all wavelengths from the received optical signal except the wavelength assigned to said output port;
    an optical receiver for converting an optical signal to an electrical signal;
    an ATM Layer cell processor for processing cells to be transmitted over said transmit link; and
    a transmit interface for converting an electrical signal to an optical signal for transmission over said transmit link.

5. The switch according to claim 3, further comprising a tunable optical sense unit adapted to receive an optical signal from an output port on said switch, said tunable optical sense unit for detecting the presence of optical signal at the wavelength associated with the destination output port the ATM cell is to be forwarded to.

6. The switch according to claim 1, wherein said switch module comprises a passive optical star coupler.

7. The switch according to claim 1, wherein each interface module comprises a single output queue.

8. The switch according to claim 1, wherein each interface module comprises a plurality of unicast queues, one queue per output port per priority level.

9. The switch according to claim 1, wherein each interface module comprises a multicast queue for distributing ATM cells to multiple destinations.

10. The switch according to claim 1, wherein each interface module comprises multicast means comprising:
    a buffer for storing the ATM cell to be multicast; and
    an output port designation adapted to indicate the one or more destination output ports to which the ATM cell is to be multicast to.

11. The switch according to claim 1, wherein each interface module comprises schedule means for controlling the forwarding of ATM cells from said interface module to said switch module, said schedule means adapted to check a plurality of queues for data ready to be transmitted, and for each queue with data to transmit, forwarding ATM cells stored in said queue to said switch module.

12. An optical switch for switching a stream of Asynchronous Transfer Mode (ATM) cells received over one of a plurality of receive lines and being switched to one of a plurality of transmit lines, comprising:
    a plurality of interface modules, each interface module comprising:
    cell input means adapted to receive ATM cells over said receive line, process said ATM cells to determine a destination output port in accordance therewith and to store said ATM cells in one of a plurality of queues in accordance with the destination output port associated therewith;
    a tunable optical transmitter whose wavelength is set according to the destination output port associated with the ATM cell to be forwarded;
    a tunable sense means adapted to sense for the presence of optical signal having a wavelength corresponding to that of the selected destination output port of the ATM cell to be forwarded;
    scheduler means adapted to set the wavelength of said tunable optical transmitter and tunable sense means to that of the destination output port of the ATM cell to be forwarded and, in the absence of any sensed optical signal, to forward said ATM cell to said destination output port via an optical start coupler;
    receive means adapted to receive one of a plurality of outputs of said optical star coupler and fixably tuned to receive and filter out all but one of a plurality of wavelengths;
    cell output means adapted to receive and process switched ATM cells for transmission over a transmit line; and
    said optical star coupler adapted to simultaneously couple any optical signal received on each of its input ports to all of its output ports.

13. A method of switching a stream of Asynchronous Transfer Mode (ATM) cells received over one of a plurality of receive lines and being switched to one of a plurality of transmit lines, said method comprising the steps of:

processing said ATM cells received over said receive line so as to determine a destination output port in accordance therewith;

storing each ATM cell in one of a plurality of output queues in accordance with the destination output port and priority associated with said ATM cell;

for each queue holding data to be transmitted, sensing for the presence of an optical signal having a wavelength corresponding to that of the destination output port associated with the particular queue;

in the absence of said optical signal, simultaneously transmitting the data in said queue to all output ports using the wavelength associated with the destination output port; and filtering at each output port, all wavelengths except the fixed wavelength associated with the destination output port.

* * * * *